US005709289A

United States Patent [19]

Peter et al.

[11] Patent Number: 5,709,289

[45] Date of Patent: Jan. 20, 1998

[54] COMPENSATING DEVICE

[75] Inventors: Günter Peter, Tholey; Klaus Stemmler, Neunkirchen, both of Germany

[73] Assignee: Hydac Technology GmbH, Sulzbach/Saar, Germany

[21] Appl. No.: 638,236

[22] Filed: Apr. 26, 1996

[30] Foreign Application Priority Data

May 15, 1995 [DE] Germany ........................ 195 17 401.1

[51] Int. Cl.[6] ........................ F16F 9/04

[52] U.S. Cl. ........................ 188/298; 138/31

[58] Field of Search ........................ 188/298, 297, 188/322.5; 236/55, 57; 138/26, 30, 31; 267/122, 195; 336/55

[56] References Cited

U.S. PATENT DOCUMENTS

| | | | |
|---|---|---|---|
| 2,703,108 | 3/1955 | McCuistion | 138/31 |
| 3,670,276 | 6/1972 | Theodore | 336/92 |
| 4,225,111 | 9/1980 | Stahle | 251/87 |
| 4,577,663 | 3/1986 | Anderson | 138/31 |
| 4,881,499 | 11/1989 | Dietrich | 123/90.52 |

FOREIGN PATENT DOCUMENTS

| | | |
|---|---|---|
| 62619 | 7/1968 | Germany . |
| 62621 | 7/1968 | Germany . |

*Primary Examiner*—Robert J. Oberleitner
*Assistant Examiner*—C. T. Bartz
*Attorney, Agent, or Firm*—Roylance, Abrams, Berdo & Goodman, L.L.P.

[57] ABSTRACT

A compensating device, especially for railway car transformers, has a compensation receptacle including a fluid-carrying connection with the interior of the housing of the transformer. In the compensation receptacle, a compensating plate is movable along an adjusting axis under the influence of an accumulator, and is in engagement with the transformer oil carried in the compensation receptacle. A guide arrangement for controlling the movement of the compensating plate includes two sheathings slidable counter to one another. One sheathing is connected with the compensating plate. The other sheathing is connected with the stationary parts of the compensation receptacle. At least one of the sheathings cooperates with a detent surface on the compensating plate or on the compensation receptacle. The compensating device can be arranged in a railway car in the underfloor compartment. Even with high lateral or cross forces, the compensating device produces a continuously working fluid connection between the compensation receptacle and the transformer housing.

19 Claims, 1 Drawing Sheet

COMPENSATING DEVICE

FIELD OF THE INVENTION

The present invention relates to a compensating device, especially for transformers on railway cars. A compensation receptacle has a fluid-carrying connection with the interior of the housing of the transformer. A compensating plate is arranged movable along an adjusting axis in the compensation receptacle. The compensating plate, under the influence of an accumulator, is in engagement with the transformer oil carried in the compensation receptacle.

BACKGROUND OF THE INVENTION

During the operation of transformers in railway cars, work temperatures reach from −30 degrees C. up to 135 degrees C. The transformer oil used in the transformer, generally in the form of silicon oil, is subject to volume fluctuations of more than 10 percent. In the present state of the art, to compensate for these temperature-caused volume fluctuations, a compensation receptacle is mounted over the transformer. The compensation receptacle supplies transformer oil by discharge through a fluid-carrying connection into the interior of the housing of the transformer, when the operational temperatures are low. When operational temperatures are high, the compensation receptacle receives transformer oil originating in the transformer, in the manner of a compensating vessel.

Problems arise especially when incorporating this type of compensation receptacle in railway cars. With the operation of the railway car, lateral or cross forces in the magnitude of 5 g can occur. These forces prevent uniform feed or discharge of transformer oil through the fluid-carrying connection. Additionally, transformer oil could splash over in the compensation receptacle which is inherently undesirable for obvious reasons.

Because of the cost of the required maintenance of the transformer, it is completely removed from the railway car and exchanged for a new or retrofitted transformer. Unnecessary down times of the railway car are avoided in this manner. In the assembly and disassembly procedure, the conventional compensating device mounted on top of the transformer is in an awkward position that prevents rapid assembly and disassembly of the transformer. For space considerations, it would obviously be practical to arrange the compensating device in the underfloor compartment of the railway car.

A compensating device disclosed in East German Economic Patent 62 619 operates without any guide arrangement for its compensating plate. Consequently, it cannot reliably absorb the high lateral or cross forces experienced during operation of a railway car. The compensating plate works together with detents mounted on its bottom to avoid excessive expansion of the bellows-like compensation receptacle. That arrangement alone requires a construction of large dimensions and is consequently not suitable for the cramped underfloor compartment of a railway car. Also, that compensating device is intended to be a part of and assembled and disassembled as a structural part of the transformer, which is correspondingly costly and increases the down times of the railway car.

East German Economic Patent 62 621 discloses a guide arrangement for a compensating device for transformers in the form of a shearing assembly. At least three round bellows-like bodies serve as the compensation receptacle. The bodies are arranged so that their longitudinal axes coincide with the corners of a polygon. Compensating plates, arranged at the ends, serve as covers of the bellows-like bodies, and are guided by the shearing assembly. The shearing assembly, serving as guide arrangement, therefore, includes detents which limit the path of movement of the compensation receptacle and protect it from overload. This known compensating device is likewise of large construction and would not be suitable for use in the underfloor compartment of a railway car. Furthermore, restraints inherent in the shearing assembly are not to be precluded, insofar as high lateral or cross forces continue to have an influence on the compensating device.

SUMMARY OF THE INVENTION

Objects of the present invention are to provide a compensating device which can be arranged in a railway car which can be fit in the underfloor compartment and which, even at high lateral or cross forces, produces a continuously effective fluid connection between the compensation receptacle and the transformer housing.

The foregoing objects are basically obtained by a compensating device, especially for railway car transformers, comprising a compensation receptacle, with stationary parts connecting means for coupling the receptacle in fluid communication with an interior of a transformer housing, and a compensating plate mounted in the receptacle for movement along an adjusting axis. An accumulator engages and biases the compensating plate against transformer oil in the receptacle. Guide means are coupled to the receptacle and the compensating plate for guiding movement of the compensating plates in the receptacle. The guide means includes first and second sheathings which are slidably connected to one another. The first sheathing is connected to the compensating plate. The second sheathing is connected to the stationary parts of the receptacle. One of the sheathings cooperates with a detent surface on one of the compensating plate and the receptacle.

The transformer oil in the compensation receptacle is held under constant "tension" in the compensation receptacle. Under the pressure of the compensating plate, a constant afterflow of the transformer oil into the interior of the housing of the transformer is guaranteed. In the case of too much transformer oil in the transformer housing, for example if working under high operational temperatures, the compensating plate is raised counter to the influence of the accumulator, corresponding to the excess volume being generated. Even in this operational situation the compensating plate exerts a constant force of pressure on the transformer oil being delivered into the compensation receptacle.

With this arrangement, which is associated with low pressure technology, the undesired splashing over of the transformer oil into the compensation receptacle no longer occurs. Even under high g forces, the function of the compensating device does not come into question.

As a result of the sheathings engaging in one another and the special arrangement of the detent surfaces, overstraining of the bellows, resulting from too strong pressing together or compression caused by the flowing of the transformer oil into the compensation receptacle, is counteracted. Also, a reliably functioning guiding arrangement of small structural dimensions is obtained. The reduced guide dimensions facilitate adapting the device to the cramped space in the underfloor compartment of a railway car. Even in the case of high lateral or cross forces, disturbance-free operation is guaranteed by the reverse side support arrangement of the sheathings of the guide arrangement. Preferably, the two sheathings are slidable counter to one another with a predetermined play for this purpose, so that checks or escapements of/from the compensating device are certainly avoided.

In one preferred embodiment of the compensating device according to the present invention, the compensating plate is connected with one end of a folding bellows. The other end of the bellows is connected with the stationary parts of the compensation receptacle. In this manner the compensating plate with the bellows defines a certain air volume within the compensation receptacle. The bellows functions as a sealing element sealing the compensating device and separates an air volume within the bellows from the supply reservoir for the transformer oil. Since the bellows connected with the compensating plate can follow the movements of the compensating plate without difficulty, a resulting coordination between air volume and oil volume is provided continuously.

In another preferred embodiment of the device according to the present invention, the accumulator is a helical spring arranged within the sheathings. The spring is supported with one end on the compensating plate and another end on the stationary parts of the compensation receptacle. This helical spring, preferably in the form of a pressure spring, represents a structurally simple machine part. However, the spring can exert considerable adjusting force on the compensating plate, such that the transformer oil stored within the compensating device stands under the required initial stress pressure.

In another preferred embodiment of the compensating device according to the present invention, the stationary parts of the compensation receptacle are formed of two cover plates which are surrounded on their edges by a housing side. In this manner a predeterminable volume of transformer oil can also be stored between housing side and the bellows.

Viewing it in some detail, the housing side preferably surrounds the bellows with a predeterminable spacing. The fluid-carrying connection in the form of a conduit carrying the transformer oil then opens into the compensation receptacle between the compensating plate and the second cover plate. Because of this arrangement, a constant rate of afterflow of transformer oil is guaranteed through the fluid-carrying connection.

Preferably, at least the compensation receptacle, the compensating plate and the bellows are configured as cylindrical structures. Even with cramped underfloor incorporation of the structure, a good capacity of the compensating device is still provided.

Other objects, advantages and salient features of the present invention will become apparent from the following detailed description, which, taken in conjunction with the annexed drawings, discloses a preferred embodiment of the present invention.

BRIEF DESCRIPTION OF THE DRAWING

Referring to the drawing which forms a part of this disclosure.

Detailed Description of the Invention

Figure 1:
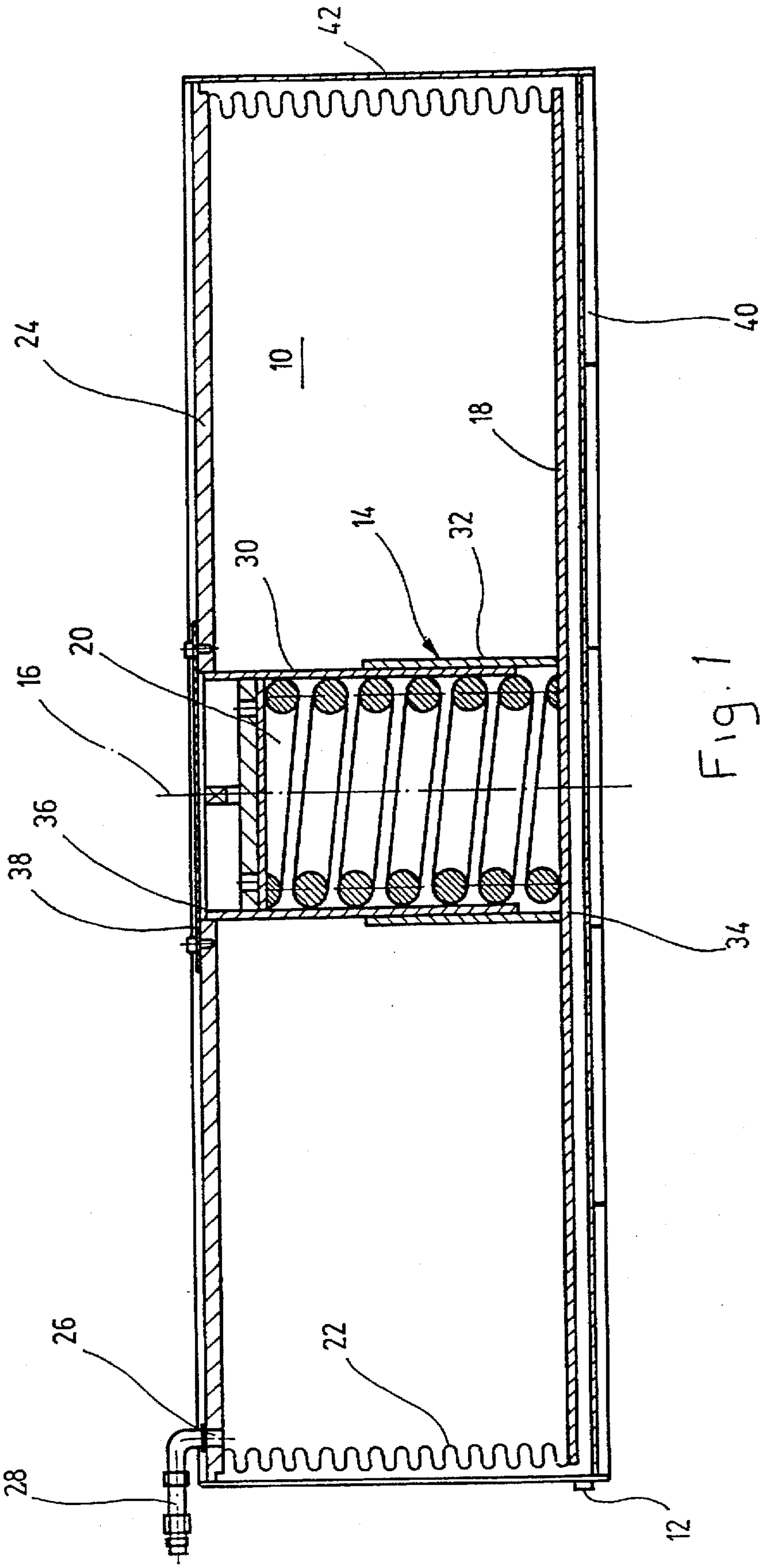
FIG. 1 is a side elevational view in section of a compensating device in a built-in working position according to the present invention.

The compensating device according to the present invention has a compensation receptacle 10. At its bottom edge, receptacle 10 has a connection member 12 providing the connection to a fluid-carrying conduit (not shown) to connect the interior of compensation receptacle 10 with the interior of the transformer housing (not shown). A compensating plate 18 is arranged to be movable along an adjusting axis 16 by means of a guide arrangement, indicated in its entirety with reference 14. Plate 18 is in engagement with the transformer oil (not shown) carried in the compensation receptacle under the influence of an accumulator in the form of a helical pressure spring 20.

Compensating plate 18, preferably formed of a sheet of super-refined steel, is connected with a bottom end of a bellows 22. The other or top end of bellows 22 is connected with stationary parts of the compensation receptacle, in the form of a top cover plate 24. Compensating plate 18 with bellows 22 thereby limits an air volume within compensation receptacle 10. To obtain pressure compensation within this enclosable air volume, an opening 26 is provided on top cover plate 24. A feed and discharge conduit 28 opens with one end in the interior of compensation receptacle 10. The other end of feed and discharge conduit 28 can be attached to a filtering assembly (not shown), in order to preclude air polluted with transformer oil from passing unfiltered out of the compensation receptacle, for example, when there is a breakdown of the bellows.

The guide device 14 includes two slidable cylindrical or tubular sheathings 30 and 32 telescopically sliding in opposite directions counter to one another. The bottom or outside sheathing 32 is connected with compensating plate 18. The inside or top sheathing 30 is connected with cover plate 24. Sheathing 30 is guided within bottom sheathing 32 and cooperates with a detent surface 34 on compensating plate 18. In the reverse case however, the outside sheathing 32 can extend further along axially upwardly such that, upon pressing together of pressure spring 20 with corresponding in-flowing of transformer oil into compensation receptacle 10, the outside sheathing can impact on a bottom detent surface formed by the bottom of cover plate 24 for the protection of bellows 22.

For this purpose, the two sheathings 30 and 32 are arranged with predetermined play slidably counter to one another. Top sheathing 30 is engaged in a discharge opening 36 of compensating plate 24, and is sealed relative to this opening by means of a sealing plate 38 sealing the opening from the surrounding environment.

In addition to top housing cover 24 the compensating device also has a housing bottom 40. The housing cover and bottom are surrounded on their edges by a housing side 42. Housing side 42 surrounds bellows 22 with a predeterminable spacing therefrom. Between compensating plate 18 and the housing bottom 40, the fluid-carrying connection in the form of a conduit (not shown) opens through connecting member 12 into compensation receptacle 10. Transformer oil 10 is then separated by compensating plate 18 and bellows 22 from the air side of compensation receptacle 10. Passage of the transformer oil, mostly in the form of silicon oil, is precluded on the air side of compensation receptacle 10.

When transformer oil required for operation is conducted through connection member 12 into the interior of compensation receptacle 10, pressure spring 20 is pressed together to a predetermined degree corresponding to the feed volume. Compensating plate 18 is moved upward, as viewed in the drawing, along its adjusting axis 16. Bellows 22 is pressed together to the same degree. The air volume carried in compensation receptacle 10 within bellows 22 is compressed to the degree comparable to the in-flowing transformer oil and flows out through opening 26 and feed and discharge conduit 28. To prevent damage to bellows 22, a maximum degree of adjustment is provided. Adjustment is terminated when the bottom of inside guided sheathing 30 impacts on detent surface 34 of compensating plate 18.

If transformer oil is required within the transformer, the existing pressure ratios work in connection member 12. Pressure spring 20 is relieved. The transformer oil is fed over compensating plate 18 into the housing of the transformer.

With the compensating device according to the present invention, dynamic changes and inversions are possible with the feed and discharge of the transformer oil. On the basis of the pressure exerted by means of the accumulator in the form of pressure spring 20, the compensating device can also be arranged beneath the transformer in the underfloor compartment of a railway car. From the underfloor compartment, the compensating device can mandate the delivery of fluid.

What is claimed is:

1. A compensating device, for railway transformers, comprising:

a compensation receptacle with stationary parts;

connecting means for coupling said receptacle in fluid communication with an interior of a transformer housing;

a compensating plate mounted in said receptacle for movement along an adjusting axis;

an accumulator engaging and biasing said compensating plate against transformer oil in said receptacle;

guide means, coupled to said receptacle and said compensating plate, for guiding movement of said compensating plate in said receptacle, said guide means including first and second sheathings which are slidably connected to and directly engage one another, said first sheathing being connected to said compensating plate, said second sheathing being connected to said stationary parts of said receptacle, one of said sheathings cooperating with a surface on one of said compensating plate and said receptacle; and a bellows located in said receptacle, said bellows having a first end connected to said compensating plate and a second end connected with said stationary parts of said receptacle, said compensating plate and said bellows limiting an air volume within said receptacle.

2. A compensating device according to claim 1 wherein said first and second sheathings have dimensions substantially smaller than dimensions of said receptacle and said compensating plate in directions transverse to said adjusting axis.

3. A compensating device according to claim 1 wherein said first sheathing slides counter to said second sheathing with predeterminable play.

4. A compensating device according to claim 1 wherein said accumulator comprises a helical pressure spring surrounded by said sheathings, a first end of said spring being supported on said compensating plate, a second end of said spring being supported on said stationary parts of said receptacle.

5. A compensating device according to claim 1 wherein said stationary parts of said receptacle comprise first and second sealing covers connected at edges thereof by a housing side encompassing said edges.

6. A compensating device, for railway transformers, comprising:

a compensation receptacle with stationary parts, said stationary parts of said receptacle including first and second sealing covers connected at edges thereof by a housing side encompassing said edges;

connecting means for coupling said receptacle in fluid communication with an interior of a transformer housing;

a compensating plate mounted in said receptacle for movement along an adjusting axis;

an accumulator engaging and biasing said compensating plate against transformer oil in said receptacle;

guide means, coupled to said receptacle and said compensating plate, for guiding movement of said compensating plate in said receptacle, said guide means including first and second sheathings which are slidably connected to and directly engage one another, said first sheathing being connected to said compensating plate, said second sheathing being connected to said stationary parts of said receptacle, one of said sheathings cooperating with a detent surface on one of said compensating plate and said receptacle; and a bellows located in said receptacle, said bellows having a first end connected to said compensating plate and a second end connected with said stationary parts of said receptacle, said compensating plate and said bellows limiting an air volume within said receptacle;

said housing side surrounding said bellows at a predeterminable spacing;

said connecting means opening into said receptacle between said compensating plate and said second sealing cover.

7. A compensating device according to claim 6 wherein said compensating receptacle, said compensating plate and said bellows are cylindrical.

8. A compensating device according to claim 1 wherein said first and second sheathings telescope relative to one another during movement of said compensating plate along said adjusting axis.

9. A compensating device according to claim 1 wherein said guide means prevents substantial movement of said compensating plate and said receptacle in directions transverse to said adjusting axis.

10. A compensating device according to claim 11 wherein said guide means prevents substantial movement of said compensating plate and said receptacle in directions transverse to said adjusting axis.

11. A compensating device, for railway transformers, comprising:

a compensation receptacle with stationary parts;

connecting means for coupling said receptacle in fluid communication with an interior of a transformer housing;

a compensating plate mounted in said receptacle for movement along an adjusting axis;

an accumulator engaging and biasing said compensating plate against transformer oil in said receptacle; and guide means, coupled to said receptacle and said compensating plate, for guiding movement of said compensating plate in said receptacle, said guide means including first and second sheathings which are slidably connected to and directly engage one another, said first sheathing being connected to said compensating plate, said second sheathing being connected to said stationary parts of said receptacle, one of said sheathings cooperating with a detent surface on one of said compensating plate and said receptacle, said first and second sheathings having dimensions substantially smaller than dimensions of said receptacle and said compensating plate in directions transverse to said adjusting axis.

12. A compensating device according to claim 6 wherein said first sheathing slides counter to said second sheathing with predeterminable play.

13. A compensating device according to claim 6 wherein said accumulator comprises a helical pressure spring surrounded by said sheathings, a first end of said spring being supported on said compensating plate, a second end of said spring being supported on said stationary parts of said receptacle.

14. A compensating device according to claim 6 wherein said first and second sheathings telescope relative to one another during movement of said compensating plate along said adjusting axis.

15. A compensating device according to claim 6 wherein said guide means prevents substantial movement of said compensating plate and said receptacle in directions transverse to said adjusting axis.

16. A compensating device according to claim 6 wherein said first and second sheathings have dimensions substantially smaller than dimensions of said receptacle and said compensating plate in directions transverse to said adjusting axis.

17. A compensating device according to claim 11 wherein said first sheathing slides counter to said second sheathing with predeterminable play.

18. A compensating device according to claim 11 wherein said accumulator comprises a helical pressure spring surrounded by said sheathings, a first end of said spring being supported on said compensating plate, a second end of said spring being supported on said stationary parts of said receptacle.

19. A compensating device according to claim 11 wherein said first and second sheathings telescope relative to one another during movement of said compensating plate along said adjusting axis.

* * * * *